United States Patent
Telmos

(10) Patent No.: US 10,029,778 B2
(45) Date of Patent: Jul. 24, 2018

(54) AIRCRAFT DOOR WITH COMPRESSIBLE HEADER

(71) Applicant: Gulfstream Aerospace Corporation, Savannah, GA (US)

(72) Inventor: Robert J. Telmos, Savannah, GA (US)

(73) Assignee: Gulfstream Aerospace Corporation, Savannah, GA (US)

(*) Notice: Subject to any disclaimer, the term of this patent is extended or adjusted under 35 U.S.C. 154(b) by 0 days.

(21) Appl. No.: 14/719,420

(22) Filed: May 22, 2015

(65) Prior Publication Data

US 2016/0340019 A1    Nov. 24, 2016

(51) Int. Cl.
*B64C 1/14* (2006.01)
*B64C 1/10* (2006.01)
*B64C 11/00* (2006.01)

(52) U.S. Cl.
CPC .............. *B64C 1/1461* (2013.01); *B64C 1/10* (2013.01); *B64C 1/1469* (2013.01); *B64C 11/00* (2013.01)

(58) Field of Classification Search
CPC ....... B64C 1/1461; B64C 1/10; B64C 1/1469; B64C 1/14; B64C 1/1407; B64C 1/1438; B64D 11/0023; E06B 1/603; E06B 1/3069; E06B 1/6084
See application file for complete search history.

(56) References Cited

U.S. PATENT DOCUMENTS

| | | | |
|---|---|---|---|
| 3,086,261 A | 4/1963 | Lapof | |
| 4,109,416 A * | 8/1978 | Newson | B60J 5/06 49/316 |
| 4,911,219 A | 3/1990 | Dalrymple | |
| 5,515,901 A * | 5/1996 | Hall | E05D 15/264 160/206 |
| 6,186,444 B1 * | 2/2001 | Steel | B64C 1/1423 160/118 |

(Continued)

FOREIGN PATENT DOCUMENTS

DE    819316 C    10/1951
GB    1504508    3/1978

OTHER PUBLICATIONS

German Patent and Trade Mark Office, Search Report for German Patent Application No. 10 2016 109 290.8 dated Mar. 17, 2017.

(Continued)

*Primary Examiner* — Jessica B Wong
(74) *Attorney, Agent, or Firm* — LKGlobal | Lorenz & Kopf, LLP

(57) ABSTRACT

The disclosed embodiments relate to an aircraft having an interior door with a compressible header. Accordingly to non-limiting embodiments, a slideable door panel includes an opening in a top portion thereof to receive a compressible header configured to reside in the opening of the slideable door panel. The compressible header includes a biasing mechanism configured to upwardly bias the compressible header against the headliner when closed. The compressible header is also configured to allow lateral movement of the compressible header within the opening. The compressibility of the compressible header and lateral movement resist the formation of gaps between the compressible header and the headliner during flight.

11 Claims, 6 Drawing Sheets

(56) References Cited

U.S. PATENT DOCUMENTS

| | | | |
|---|---|---|---|
| 7,441,726 B2* | 10/2008 | Melberg | B64C 1/1469 244/129.4 |
| 8,763,327 B2 | 7/2014 | Harter et al. | |
| 9,260,175 B2 | 2/2016 | Cabourg et al. | |
| 2006/0048466 A1* | 3/2006 | Darnell | E06B 1/32 52/204.1 |
| 2006/0145007 A1 | 7/2006 | Melberg et al. | |
| 2009/0199491 A1 | 8/2009 | Boldt | |
| 2013/0020439 A1 | 1/2013 | Cabourg | |
| 2013/0111835 A1* | 5/2013 | Harter | E04L 32/74 52/238.1 |
| 2014/0041304 A1* | 2/2014 | Martin | E05D 15/0626 49/352 |
| 2014/0117161 A1 | 5/2014 | Harter et al. | |
| 2015/0210373 A1 | 7/2015 | Guimont et al. | |

OTHER PUBLICATIONS

USPTO, Notice of Allowance and Fee(s) Due in U.S. Appl. No. 15/002,723 dated May 2, 2018.

* cited by examiner

AIRCRAFT DOOR WITH COMPRESSIBLE HEADER

TECHNICAL FIELD

Embodiments of the present invention generally relate to aircraft, and more particularly relate to door systems for an aircraft.

BACKGROUND OF THE INVENTION

Modern business aircraft typically include a well-appointed passenger cabin for the safety and comfort of aircraft passengers. Within the passenger cabin, areas or compartments are defined by bulkheads, which may include a slidable (or pocket) door to separate one area from an adjoining area for privacy. However, due to stresses applied to the fuselage during flight, it is possible for gaps to appear between the slidable door and the aircraft ceiling or headliner. These gaps are both unappealing and may permit light penetration or a private conversation to be heard in the adjoining compartment.

Accordingly, it is desirable to provide an aircraft bulkhead door that resists the formation of gaps during flight. It is further desirable that the sliding bulkhead door be adaptable to compensate for differing stress levels applied to the fuselage during flight. Other desirable features and characteristics will become apparent from the subsequent summary and detailed description and the appended claims, taken in conjunction with the accompanying drawings and the foregoing technical field and background.

SUMMARY

The disclosed embodiments relate to an aircraft having an interior door with a compressible header. Accordingly to non-limiting embodiments, a slideable door panel includes an opening in a top portion thereof to receive a compressible header configured to reside in the opening of the slideable door panel. The compressible header includes a biasing mechanism configured to upwardly bias the compressible header against the headliner when closed. The compressible header is also configured to allow lateral movement of the compressible header within the opening. The compressibility of the compressible header and lateral movement resist the formation of gaps between the compressible header and the headliner during flight.

DESCRIPTION OF THE DRAWINGS

Embodiments of the present invention will hereinafter be described in conjunction with the following drawing figures, wherein like numerals denote like elements.

DESCRIPTION OF EXEMPLARY EMBODIMENTS

As used herein, the word "exemplary" means "serving as an example, instance, or illustration." The following detailed description is merely exemplary in nature and is not intended to limit the invention or the application and uses of the invention. Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary or the following description.

The disclosed embodiments relate to an aircraft having an interior door with a compressible header. Accordingly to non-limiting embodiments, a slideable door panel includes an opening in a top portion thereof to receive a compressible header configured to reside in the opening of the slideable door panel. The compressible header includes a biasing mechanism configured to upwardly bias the compressible header against the headliner when closed. The compressible header is also configured to allow lateral movement of the compressible header within the opening. The compressibility of the compressible header and lateral movement resist the formation of gaps between the compressible header and the headliner during flight.

Figure 1:
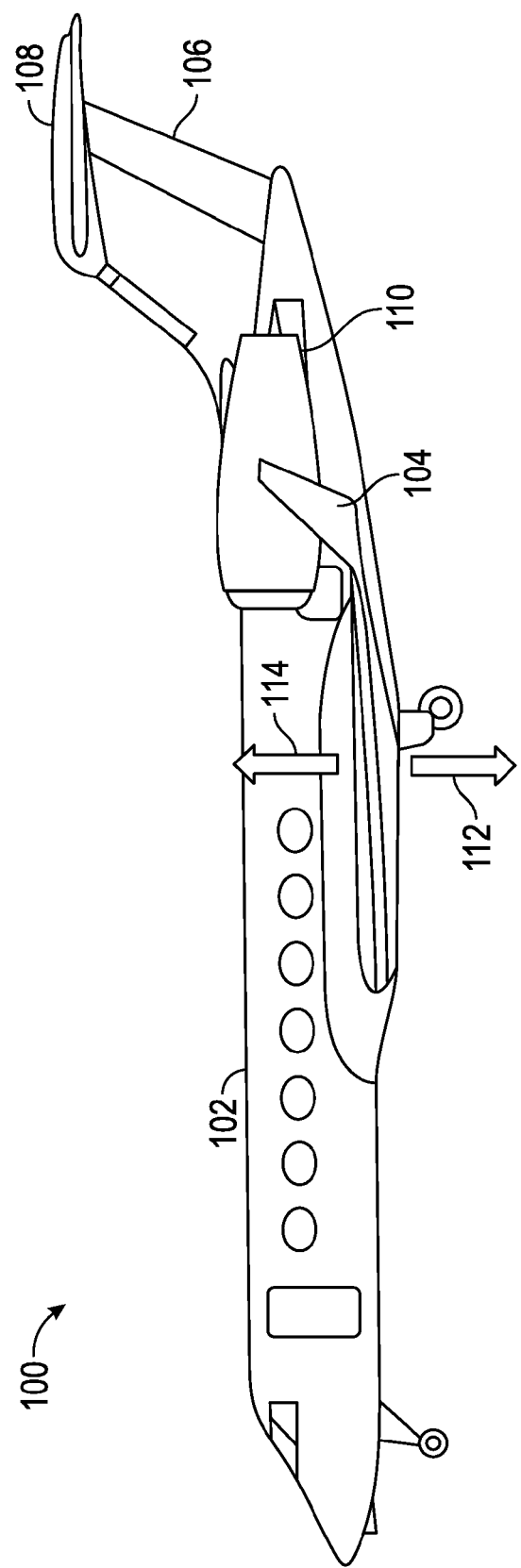
FIG. 1 is a view of an aircraft in which the disclosed embodiments can be implemented in accordance with a non-limiting implementation.

FIG. 1 is a view of an aircraft 100 in which the disclosed embodiments can be implemented in accordance with one exemplary, non-limiting implementation. In accordance with one non-limiting implementation of the disclosed embodiments, the aircraft 100 includes fuselage 102, which holds the passengers and the cargo; two main wings 104, which provide the lift needed to fly the aircraft 100; a vertical stabilizer 106 and two horizontal stabilizers 108, which are used to ensure a stable flight; and two engines 110, which provide the thrust needed to propel the aircraft 100 forward. Flight control surfaces are placed on wings 104, vertical stabilizer 106 and the horizontal stabilizers 108 to guide the aircraft 100. When the aircraft is at rest, the effects of gravity on of the wings 104 of the aircraft 100 apply a downward stress as indicated by arrow 112, which is applied to the fuselage 102. However, during flight, lift forces overcome gravity and apply an upward force on the wings 104 as indicated by arrow 114. This results in a change of the direction and potentially the magnitude of the force applied to the fuselage 104. Additionally, turbulence or other atmospheric conditions may apply varying forces to the fuselage during flight. These forces may cause some deformation of the shape of the fuselage as compared to the aircraft at rest position. This deformation may be translated into bulkhead walls or other structural members of the passenger cabin and cause gaps to appear between interior doors and their mating surfaces. Some passengers consider these gaps to be unattractive and limit privacy during flight.

Figure 2:
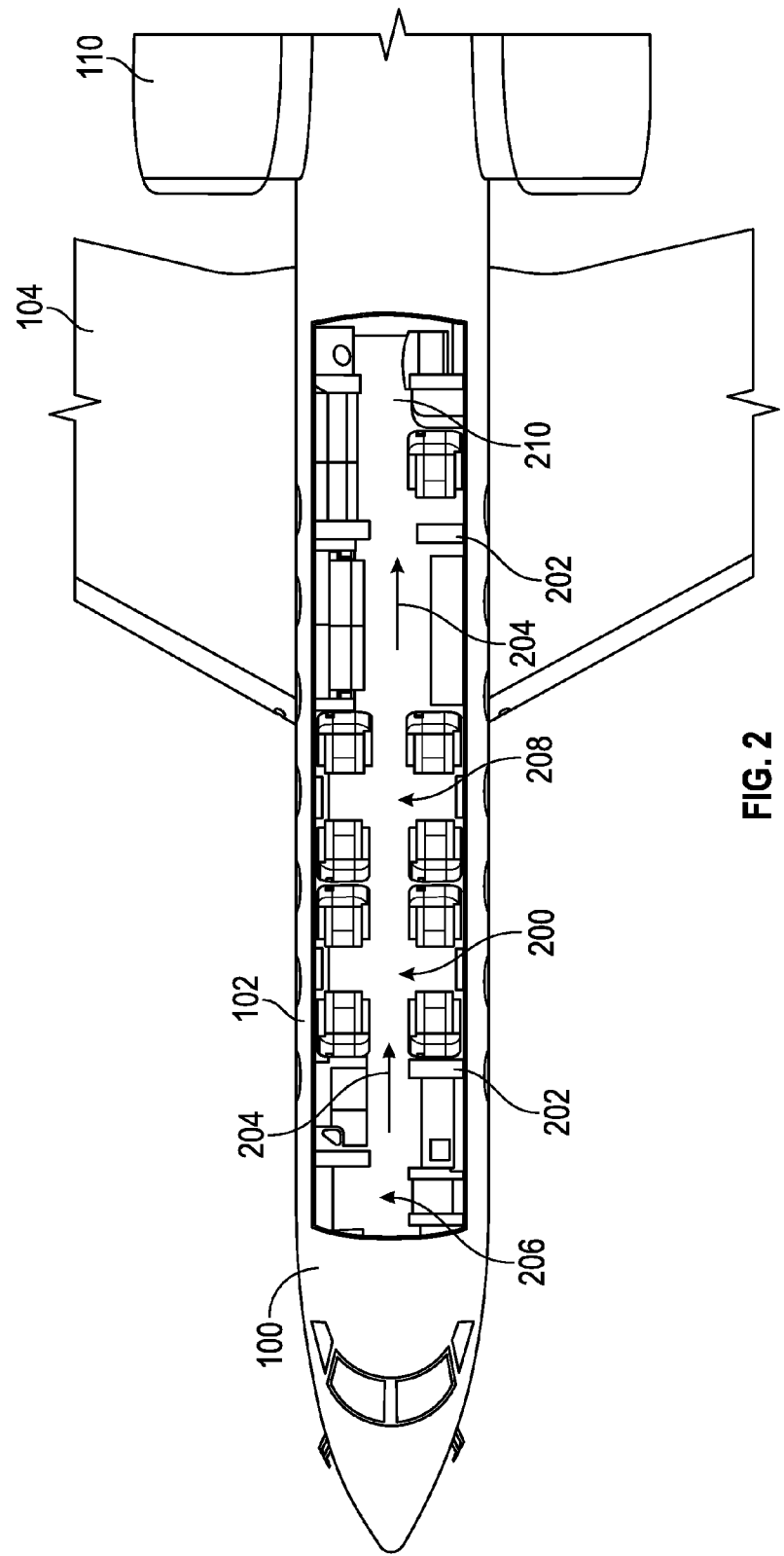
FIG. 2 is a cut-away view of the aircraft of FIG. 1 in accordance with one non-limiting implementation.

FIG. 2 is a cut-away view of the aircraft 100 to illustrate the passenger cabin 200. The passenger cabin 200 has various areas or compartments defined by bulkheads 202. In the non-limiting example of FIG. 2, three compartments are defined by the bulkheads 202; a galley area 206, a general seating area 208 and a private seating area 210. The bulkheads 202 have an opening tool for to permit passage between the various compartments 206, 208 and 210. According to non-limiting embodiments, one or both of the bulkheads 202 include a sliding (or pocket) door to close one area from an adjacent area for privacy or to reduce noise. The present invention provides an improved sliding door that resist gaps from forming between the door and the aircraft ceiling or headliner during flight as will be discussed below.

Figure 3:
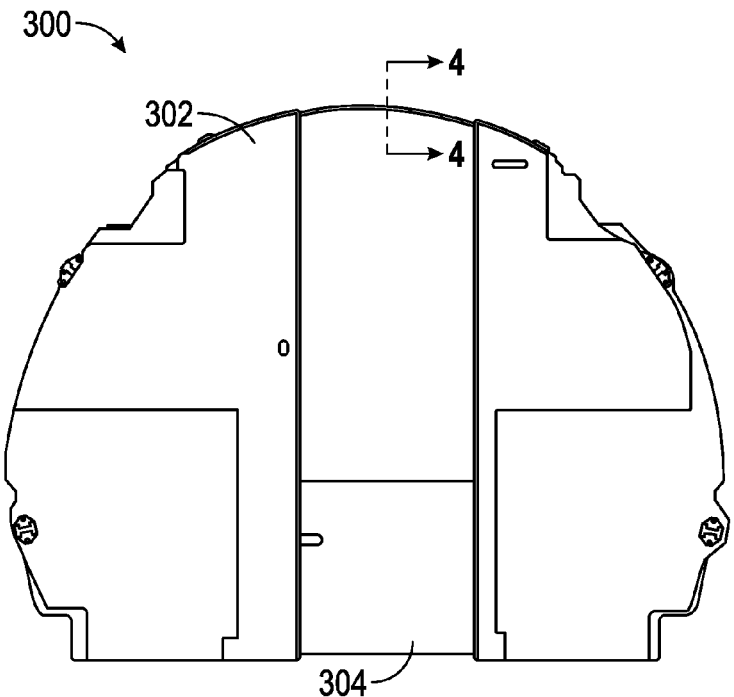
FIG. 3 is an illustration of a bulkhead and aircraft door in accordance with an exemplary implementation of the disclosed embodiments.

FIG. 3 is an illustration of one non-limiting embodiment of a slidable bulkhead door system 300 that offers the advantages of the present invention. The slidable door system 300 includes a bulkhead 302 and a slidable door panel 304 that resides in an opening (or pocket) when in the open position.

Figure 4:
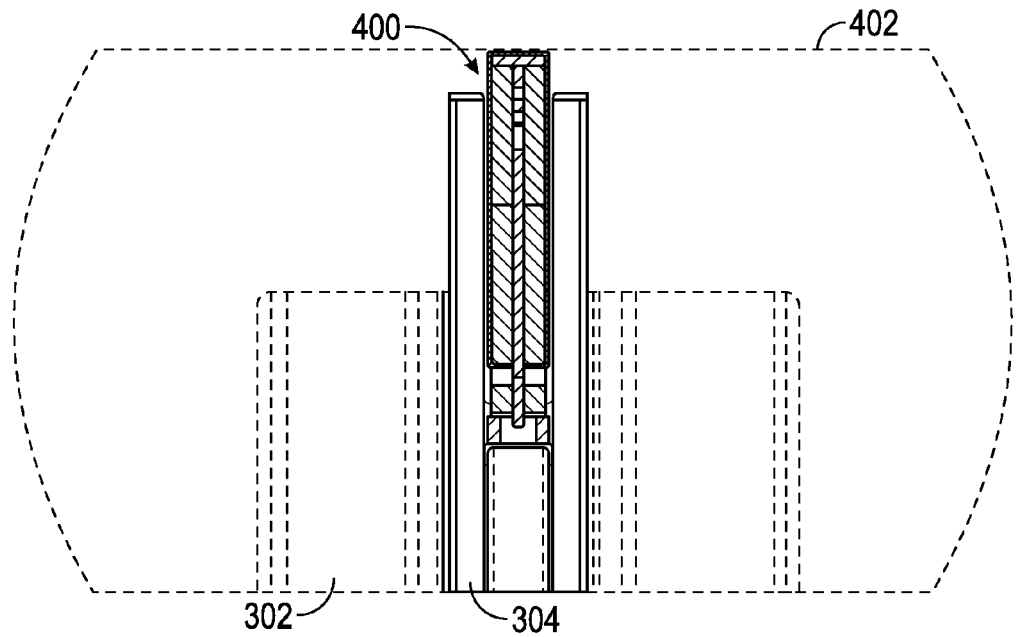
FIG. 4 is an overhead view taken alone section line 4-4 of FIG. 3 in accordance with the disclosed embodiments.
Figure 5:
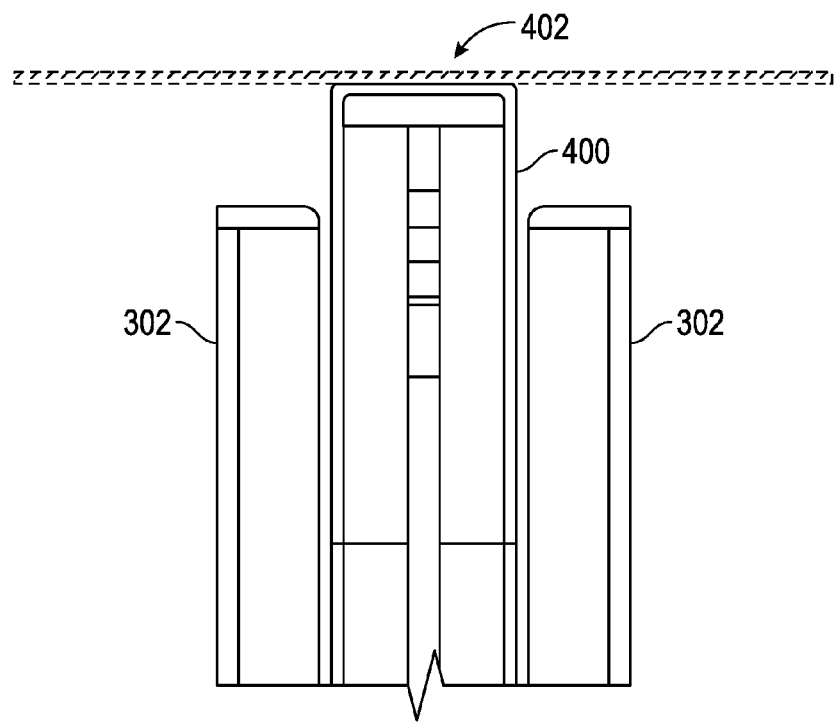
FIG. 5 is a side view of FIG. 4 in accordance with the disclosed embodiments.

FIG. 4 is a sectional view of the slidable door 304 taken a long section line 4-4. As illustrated in FIG. 4, the door panel 304 includes a compressible header 400 that is upwardly biased and configured to be compressed against a headliner 402 of the aircraft. The upward bias and compressibility of the compressible header maintain contact with the headliner 402 during the stresses caused by turbulence or flight. FIG. 5 is a side view of the door panel and compressible header 400 illustrated as being firmly compressed against the headliner 402.

Figure 6:
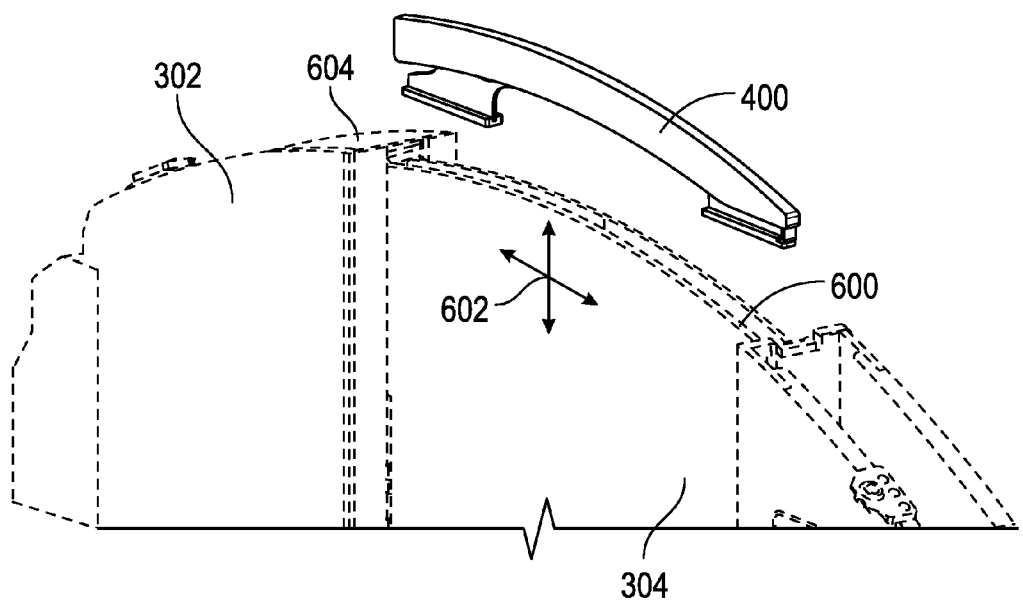
FIG. 6 is an exploded view illustrating a compressible door header in accordance with the disclosed embodiments.

FIG. 6 illustrates the compressible header 400 separated from the door panel 304. In some embodiments, the compressible header 400 resides in an opening 600 in the top portion of the door panel 304. This configuration permits up/down and lateral movement of the compressible header 400 along the direction indicated by arrows 602. As will be appreciated by those skilled in the art, the compressibility of the compressible header 400 and the multiple axes movement of the compressible header relative to the door panel 304 compensates for stresses applied to the fuselage of the aircraft along two axes and resist the appearance of gaps forming between the compressible headliner 400 and the headliner of the interior passenger cabin. Also illustrated in FIG. 6 is the opening (or pocket) 604 of the bulkhead 302 that receives the door panel 304 when in the open position. According to non-limiting embodiments, the upward bias applied to the compressible header 400 causes the compressible header to rise as the door panel 304 is stowed in the open position. As the door panel 304 is moved toward the closed position, the compressible header makes contact with the headliner and is compressed against the headliner while the door is in the closed position.

Figure 7:
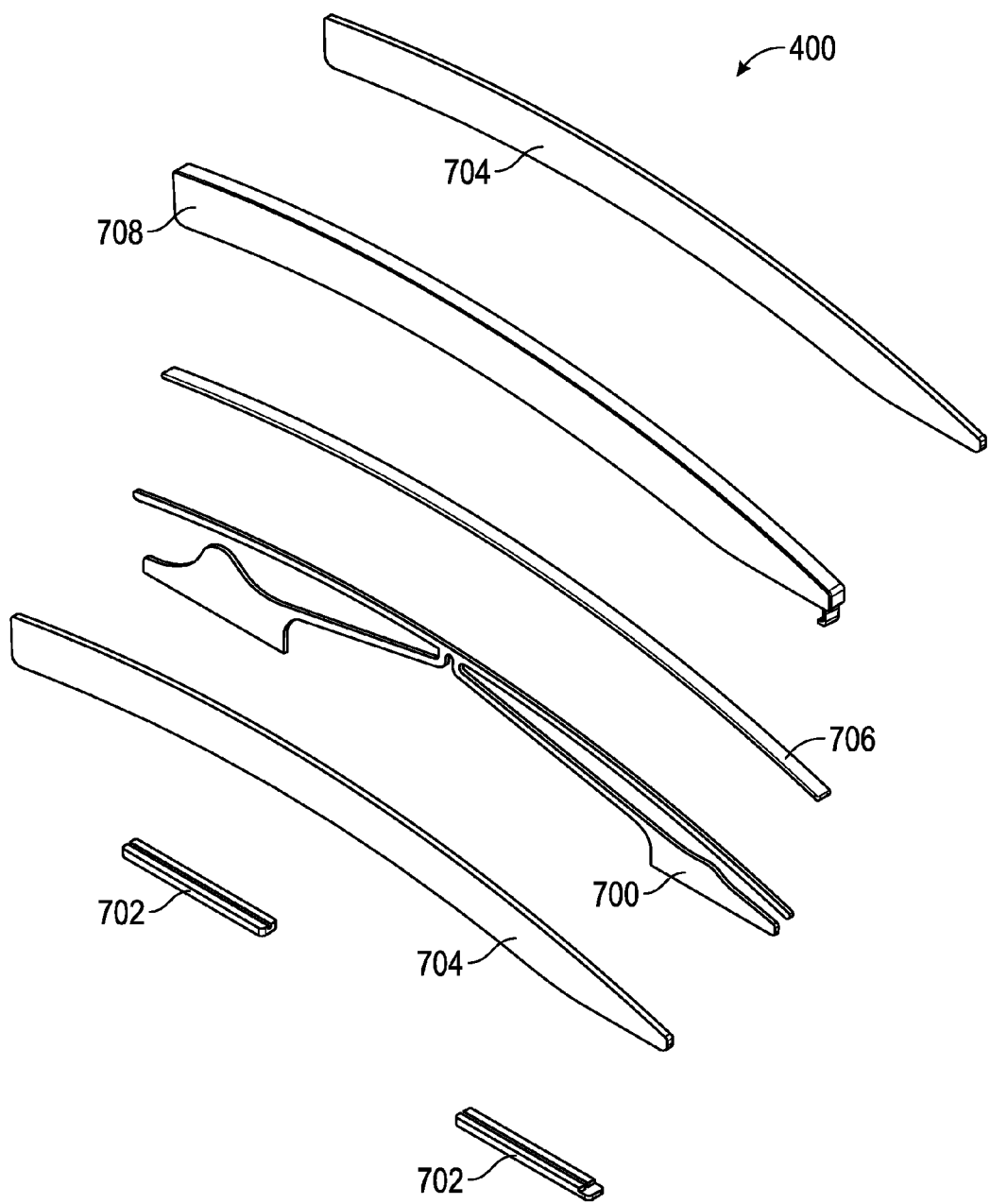
FIG. 7 is an exploded view of the compressible door head of FIG. 6 in accordance with the disclosed embodiments.

FIG. 7 illustrates the compressible header 400 and exploded form. The compressible header 400 includes a biasing member 700. In some embodiments, the biasing member 700 comprises a spring formed of a thermoplastic acrylic or polyvinyl chloride (PVC) material. As will be appreciated by those skilled in the art, other spring configurations or biasing arrangements may be employed without departing from the teachings of the present disclosure. The biasing member 700 resides in a base 702 that permits lateral movement of the compressible header 400 within the opening along the top portion of the door panel 304. In some embodiments, the base members 702 comprise a hardwood material (e.g., oak, maple, cherry or poplar) although other material may be used in any particular implementation of the disclosed embodiments. On either side of the biasing member 700 is a face panel 704, which may comprise a thermoplastic vinyl closed-cell foam in some embodiments. A top plate 706 is positioned along the top of the biasing member 700 and may also comprise a thermoplastic acrylic or PVC material. A cover 708 (which may be a decorative cover for aesthetic purposes) covers at least the visible portion of the compressible header 400. In some embodiments, the cover 708 comprises a fire-resistant material such as a carbon fiber material as one non-limiting example.

Figure 8:
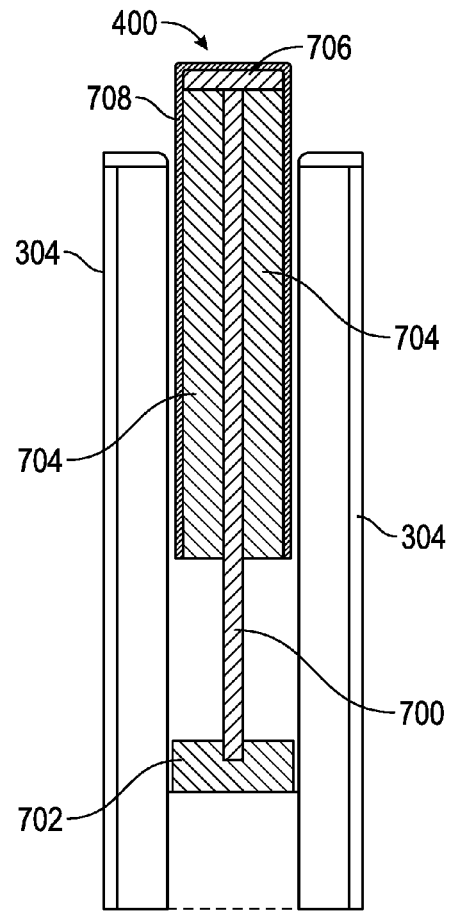
FIG. 8 is a cut-away assembled side view in accordance with the disclosed embodiments.

FIG. 8 is an assembled cross-sectional side view of the compressible header 400 illustrating the biasing member 700, base 702, face panels 704, top plate 706 and cover 708.

Figure 9:
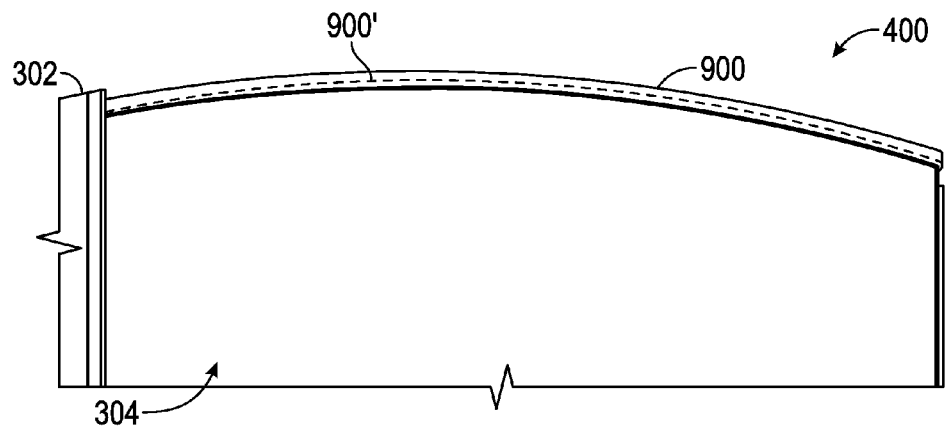
FIG. 9 illustrates the compressible feature of the compressible door head of FIG. 8 in accordance with the disclosed embodiments.

FIG. 9 illustrates the compression feature of the compressible header 400. While in the open (or stored) position the biasing member 700 causes the compressible header 400 to rise to the position shown by arrow 900 while the door panel 304 resides in the opening of the bulkhead. As the door panel 304 is moved toward the closed position, the compressible header 400 comes into contact with the headliner (not shown in FIG. 9) and is compressed to the position shown by the arrow 900'. In some embodiments, the compressed (door closed) position 900' is approximately one quarter of an inch from the uncompressed (door open) position 900.

The disclosed embodiments can provide an aircraft with an improved pocket door system that resists the appearance of gaps between the top of the door and the headliner of the interior passenger cabin during flight. This improves aesthetics within the passenger cabin and offers passengers more privacy than conventional pocket door systems used on aircraft.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other through one or more additional elements.

While at least one exemplary embodiment has been presented in the foregoing detailed description, it should be appreciated that a vast number of variations exist. For example, although the disclosed embodiments are described with reference to a door used on an aircraft, those skilled in the art will appreciate that the disclosed embodiments could be implemented in other types of vehicles. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. An interior door system for an aircraft comprising:
a door having an opening across a top portion thereof;
a compressible header configured to reside in the opening across the door, the compressible header including a biasing mechanism configured to reside in the opening across the door and upwardly bias the compressible header which is configured to permit lateral movement of the compressible header within the opening across the door, the compressible header being compressed into the opening across the door as the compressible header contacts a headliner of the aircraft as the door moves from an open position to a closed position with the compressible header configured to move laterally and vertically relative to the door when the door is in the closed position.

2. The interior door system of claim 1, wherein the door comprises a sliding door, configured to slidably move from the open position to the closed position.

3. The interior door system of claim 1, wherein the compressible header further comprises a cover for the compressible header.

4. The interior door system of claim 3, wherein the cover comprises a fire resistant material.

5. An interior door system for an aircraft, comprising:
a bulkhead having an opening therein for receiving a slideable door;
the slideable door having an opening across a top portion thereof;
a compressible header configured to reside in the opening across the slideable door, the compressible header including a biasing mechanism configured to reside in the opening across the slideable door and upwardly bias the compressible header which is configured to permit lateral movement of the compressible header within the opening across the slideable door, the compressible header being compressed into the opening across the slideable door as the compressible header contacts a headliner of the aircraft as the slideable door moves from an open position to a closed position with the compressible header configured to move laterally and vertically relative to the slidable door when the slideable door is in the closed position.

6. The interior door system of claim 5, wherein the compressible header further comprises a cover for the compressible header.

7. The interior door system of claim 6, wherein the cover comprises a fire resistant material.

8. An aircraft, comprising:
one or more engines for propelling the aircraft;
a fuselage having a passenger cabin;
a headliner covering at least a portion of a ceiling of the passenger cabin;
one or more bulkheads within the passenger cabin;
at least one of the one or more bulkheads having an opening therein for receiving a slideable door;
the slideable door having an opening across a top portion thereof;
a compressible header configured to reside in the opening across the slideable door and including a biasing mechanism configured to reside in the opening across the slideable door and upwardly bias the compressible header and configured to permit lateral movement of the compressible header within the opening across the slideable door, the compressible header being compressed into the opening across the slideable door as the compressible header contacts the headliner of the aircraft as the slideable door moves from an open position to a closed position with the compressible header configured to move laterally and vertically relative to the slidable door when the slideable door is in the closed position.

9. The aircraft of claim 8, wherein the lateral movement of the compressible header and the compression of the compressible header against the headliner resists gaps from appearing between the compressible header and the headliner due to stresses applied to the fuselage during flight of the aircraft.

10. The aircraft of claim 8, wherein the compressible header further comprises a cover for the compressible header.

11. The aircraft of claim 10, wherein the cover comprises a fire resistant material.

* * * * *